(12) United States Patent
Carr (10) Patent No.: US 10,693,627 B2
(45) Date of Patent: Jun. 23, 2020

(54) SYSTEMS AND METHODS FOR EFFICIENT FIXED-BASE MULTI-PRECISION EXPONENTIATION

(71) Applicant: Enveil, Inc., Fulton, MD (US)

(72) Inventor: Ryan Carr, Fulton, MD (US)

(73) Assignee: Enveil, Inc., Fulton, MD (US)

( * ) Notice: Subject to any disclaimer, the term of this patent is extended or adjusted under 35 U.S.C. 154(b) by 37 days.

(21) Appl. No.: 15/876,057

(22) Filed: Jan. 19, 2018

(65) Prior Publication Data

US 2018/0224882 A1 Aug. 9, 2018

Related U.S. Application Data

(60) Provisional application No. 62/448,916, filed on Jan. 20, 2017, provisional application No. 62/448,883, (Continued)

(51) Int. Cl.
| | |
|---|---|
| *G06F 7/552* | (2006.01) |
| *G06F 1/03* | (2006.01) |
| *G06F 7/72* | (2006.01) |
| *H04L 9/00* | (2006.01) |
| *H04L 9/30* | (2006.01) |
| *H04L 29/06* | (2006.01) |

(Continued)

(52) U.S. Cl.
CPC ............ *H04L 9/008* (2013.01); *G06F 1/0307* (2013.01); *G06F 7/552* (2013.01); *G06F 7/723* (2013.01); *G06F 7/728* (2013.01); *G06F 9/30014* (2013.01); *H03M 7/24* (2013.01); *H04L 9/30* (2013.01); *H04L 63/0428* (2013.01); *H04L 63/0442* (2013.01); *H04L 2209/30* (2013.01)

(58) Field of Classification Search
CPC .................... G06F 1/03; G06F 1/0307; G06F 1/035–0356; G06F 2101/08; G06F 2101/10; G06F 7/552
USPC ......................................... 708/235, 277, 606
See application file for complete search history.

(56) References Cited

U.S. PATENT DOCUMENTS

| | | | |
|---|---|---|---|
| 5,732,390 A | 3/1998 | Katayanagi et al. | |
| 6,178,435 B1 * | 1/2001 | Schmookler | G06F 7/556 708/277 |

(Continued)

FOREIGN PATENT DOCUMENTS

| | | |
|---|---|---|
| EP | 2873186 B1 | 3/2018 |
| JP | 5680007 B2 | 3/2015 |

(Continued)

OTHER PUBLICATIONS

"International Search Report" and "Written Opinion of the International Searching Authority," Patent Cooperation Treaty Application No. PCT/US2018/014535, dated Apr. 19, 2018, 9 pages.

(Continued)

*Primary Examiner* — Matthew D Sandifer
(74) *Attorney, Agent, or Firm* — Carr & Ferrell LLP (57) ABSTRACT

Systems and methods for efficient fixed-base multi-precision exponentiation are disclosed herein. An example method includes applying a multi-precision exponentiation algorithm to a base number, the multi-precision exponentiation algorithm comprises a pre-generated lookup table used to perform calculations on the base number, the pre-generated lookup table comprising pre-calculated exponentiated values of the base number.

12 Claims, 3 Drawing Sheets

Related U.S. Application Data filed on Jan. 20, 2017, provisional application No. 62/448,885, filed on Jan. 20, 2017, provisional application No. 62/462,818, filed on Feb. 23, 2017.

(51) Int. Cl.
*G06F 9/30* (2018.01)
*H03M 7/24* (2006.01)

(56) References Cited

U.S. PATENT DOCUMENTS

| | | | |
|---|---|---|---|
| 6,745,220 B1* | 6/2004 | Hars | 380/28 |
| 6,748,412 B2* | 6/2004 | Ruehle | G06F 7/556 708/491 |
| 6,910,059 B2* | 6/2005 | Lu | G06F 1/0356 708/277 |
| 7,712,143 B2 | 5/2010 | Comlekoglu | |
| 7,937,270 B2 | 5/2011 | Smaragdis et al. | |
| 8,515,058 B1 | 8/2013 | Gentry | |
| 8,565,435 B2 | 10/2013 | Gentry et al. | |
| 8,832,465 B2 | 9/2014 | Gulati et al. | |
| 9,059,855 B2 | 6/2015 | Johnson et al. | |
| 9,094,378 B1 | 7/2015 | Yung et al. | |
| 9,189,411 B2 | 11/2015 | Mckeen et al. | |
| 9,215,219 B1 | 12/2015 | Krendelev et al. | |
| 9,288,039 B1 | 3/2016 | Monet et al. | |
| 9,491,111 B1 | 11/2016 | Roth et al. | |
| 9,503,432 B2 | 11/2016 | El Emam et al. | |
| 9,514,317 B2 | 12/2016 | Martin et al. | |
| 9,565,020 B1 | 2/2017 | Camenisch et al. | |
| 9,577,829 B1 | 2/2017 | Roth et al. | |
| 9,652,609 B2 | 5/2017 | Kang et al. | |
| 9,846,787 B2 | 12/2017 | Johnson et al. | |
| 9,852,306 B2 | 12/2017 | Cash et al. | |
| 9,942,032 B1 | 4/2018 | Kornaropoulos et al. | |
| 9,946,810 B1 | 4/2018 | Trepetin et al. | |
| 9,973,334 B2 | 5/2018 | Hibshoosh et al. | |
| 10,027,486 B2 | 7/2018 | Liu | |
| 10,055,602 B2 | 8/2018 | Deshpande et al. | |
| 10,073,981 B2 | 9/2018 | Arasu et al. | |
| 10,075,288 B1 | 9/2018 | Khedr et al. | |
| 10,129,028 B2 | 11/2018 | Kamakari et al. | |
| 10,148,438 B2 | 12/2018 | Evancich et al. | |
| 10,181,049 B1 | 1/2019 | El Defrawy et al. | |
| 10,210,266 B2 | 2/2019 | Antonopoulos et al. | |
| 10,235,539 B2 | 3/2019 | Ito et al. | |
| 10,255,454 B2 | 4/2019 | Kamara et al. | |
| 10,333,715 B2 | 6/2019 | Chu et al. | |
| 10,375,042 B2 | 8/2019 | Chaum | |
| 10,396,984 B2 | 8/2019 | French et al. | |
| 10,423,806 B2 | 9/2019 | Cerezo Sanchez | |
| 10,489,604 B2 | 11/2019 | Yoshino et al. | |
| 10,496,631 B2 | 12/2019 | Tschudin et al. | |
| 2002/0032712 A1* | 3/2002 | Miyasaka | G06F 7/552 708/606 |
| 2002/0104002 A1 | 8/2002 | Nishizawa et al. | |
| 2003/0059041 A1 | 3/2003 | MacKenzie et al. | |
| 2005/0008152 A1 | 1/2005 | MacKenzie | |
| 2005/0076024 A1 | 4/2005 | Takatsuka et al. | |
| 2005/0259817 A1 | 11/2005 | Ramzan et al. | |
| 2007/0053507 A1 | 3/2007 | Smaragdis et al. | |
| 2007/0095909 A1 | 5/2007 | Chaum | |
| 2007/0140479 A1 | 6/2007 | Wang et al. | |
| 2007/0143280 A1 | 6/2007 | Wang et al. | |
| 2009/0037504 A1* | 2/2009 | Hussain | G06F 1/0307 708/277 |
| 2009/0193033 A1 | 7/2009 | Ramzan et al. | |
| 2009/0268908 A1 | 10/2009 | Bikel et al. | |
| 2009/0279694 A1 | 11/2009 | Takahashi et al. | |
| 2010/0205430 A1 | 8/2010 | Chiou et al. | |
| 2011/0026781 A1 | 2/2011 | Osadchy et al. | |
| 2011/0107105 A1 | 5/2011 | Hada | |
| 2011/0110525 A1 | 5/2011 | Gentry | |
| 2011/0243320 A1 | 10/2011 | Halevi et al. | |
| 2011/0283099 A1 | 11/2011 | Nath et al. | |
| 2012/0039469 A1 | 2/2012 | Meuller et al. | |
| 2012/0054485 A1 | 3/2012 | Tanaka et al. | |
| 2012/0066510 A1 | 3/2012 | Weinman | |
| 2012/0201378 A1 | 8/2012 | Nabeel et al. | |
| 2013/0010950 A1 | 1/2013 | Kerschbaum | |
| 2013/0051551 A1 | 2/2013 | El Aimani | |
| 2013/0054665 A1* | 2/2013 | Felch | G06F 1/0307 708/517 |
| 2013/0170640 A1 | 7/2013 | Gentry | |
| 2013/0191650 A1 | 7/2013 | Balakrishnan et al. | |
| 2013/0195267 A1 | 8/2013 | Alessio et al. | |
| 2013/0216044 A1 | 8/2013 | Gentry et al. | |
| 2013/0230168 A1 | 9/2013 | Takenouchi | |
| 2013/0246813 A1 | 9/2013 | Mori et al. | |
| 2013/0326224 A1 | 12/2013 | Yavuz | |
| 2013/0339722 A1 | 12/2013 | Krendelev et al. | |
| 2013/0339751 A1 | 12/2013 | Sun et al. | |
| 2013/0346741 A1 | 12/2013 | Kim et al. | |
| 2013/0346755 A1 | 12/2013 | Nguyen et al. | |
| 2014/0189811 A1 | 7/2014 | Taylor et al. | |
| 2014/0233727 A1 | 8/2014 | Rohloff et al. | |
| 2014/0355756 A1 | 12/2014 | Iwamura et al. | |
| 2015/0100785 A1 | 4/2015 | Joye et al. | |
| 2015/0100794 A1 | 4/2015 | Joye et al. | |
| 2015/0205967 A1 | 7/2015 | Naedele et al. | |
| 2015/0215123 A1 | 7/2015 | Kipnis et al. | |
| 2015/0227930 A1 | 8/2015 | Quigley et al. | |
| 2015/0229480 A1 | 8/2015 | Joye et al. | |
| 2015/0244517 A1 | 8/2015 | Nita | |
| 2015/0248458 A1 | 9/2015 | Sakamoto | |
| 2015/0304736 A1 | 10/2015 | Lal et al. | |
| 2015/0358152 A1 | 12/2015 | Ikarashi et al. | |
| 2016/0004874 A1 | 1/2016 | Ioannidis et al. | |
| 2016/0072623 A1 | 3/2016 | Joye et al. | |
| 2016/0105402 A1 | 4/2016 | Kupwade-Patil et al. | |
| 2016/0105414 A1 | 4/2016 | Bringer et al. | |
| 2016/0119346 A1 | 4/2016 | Chen et al. | |
| 2016/0140348 A1 | 5/2016 | Nawaz et al. | |
| 2016/0179945 A1 | 6/2016 | Lastra Diaz et al. | |
| 2016/0182222 A1 | 6/2016 | Rane et al. | |
| 2016/0323098 A1 | 11/2016 | Bathen | |
| 2016/0335450 A1 | 11/2016 | Yoshino et al. | |
| 2016/0344557 A1 | 11/2016 | Chabanne et al. | |
| 2016/0350648 A1 | 12/2016 | Gilad-Bachrach et al. | |
| 2017/0070340 A1 | 3/2017 | Hibshoosh et al. | |
| 2017/0070351 A1 | 3/2017 | Yan | |
| 2017/0099133 A1 | 4/2017 | Gu et al. | |
| 2017/0134158 A1 | 5/2017 | Pasol et al. | |
| 2017/0185776 A1 | 6/2017 | Robinson et al. | |
| 2017/0264426 A1 | 9/2017 | Joye et al. | |
| 2018/0091466 A1 | 3/2018 | Friedman et al. | |
| 2018/0139054 A1 | 5/2018 | Chu et al. | |
| 2018/0198601 A1 | 7/2018 | Laine et al. | |
| 2018/0204284 A1 | 7/2018 | Cerezo Sanchez | |
| 2018/0212751 A1 | 7/2018 | Williams et al. | |
| 2018/0212752 A1 | 7/2018 | Williams et al. | |
| 2018/0212753 A1 | 7/2018 | Williams | |
| 2018/0212754 A1 | 7/2018 | Williams et al. | |
| 2018/0212755 A1 | 7/2018 | Williams et al. | |
| 2018/0212756 A1 | 7/2018 | Carr | |
| 2018/0212757 A1 | 7/2018 | Carr | |
| 2018/0212758 A1 | 7/2018 | Williams et al. | |
| 2018/0212759 A1 | 7/2018 | Williams et al. | |
| 2018/0212775 A1 | 7/2018 | Williams | |
| 2018/0212933 A1 | 7/2018 | Williams | |
| 2018/0234254 A1 | 8/2018 | Camenisch et al. | |
| 2018/0267981 A1 | 9/2018 | Sirdey | |
| 2018/0270046 A1 | 9/2018 | Carr | |
| 2018/0276417 A1 | 9/2018 | Cerezo Sanchez | |
| 2018/0343109 A1 | 11/2018 | Koseki et al. | |
| 2018/0359097 A1 | 12/2018 | Lindell | |
| 2018/0373882 A1 | 12/2018 | Veugen | |
| 2019/0013950 A1 | 1/2019 | Becker et al. | |
| 2019/0042786 A1 | 2/2019 | Williams et al. | |
| 2019/0108350 A1 | 4/2019 | Bohli et al. | |
| 2019/0158272 A1 | 5/2019 | Chopra et al. | |
| 2019/0229887 A1 | 7/2019 | Ding et al. | |
| 2019/0238311 A1 | 8/2019 | Zheng | |
| 2019/0251553 A1 | 8/2019 | Ma et al. | |

(56) References Cited

U.S. PATENT DOCUMENTS

| | | | |
|---|---|---|---|
| 2019/0251554 | A1 | 8/2019 | Ma et al. |
| 2019/0253235 | A1 | 8/2019 | Zhang et al. |
| 2019/0260585 | A1 | 8/2019 | Kawai et al. |
| 2019/0280880 | A1 | 9/2019 | Zhang et al. |
| 2019/0312728 | A1 | 10/2019 | Poeppelmann |
| 2019/0327078 | A1 | 10/2019 | Zhang et al. |
| 2019/0334716 | A1 | 10/2019 | Kocsis et al. |
| 2019/0349191 | A1 | 11/2019 | Soriente et al. |
| 2019/0371106 | A1 | 12/2019 | Kaye |

FOREIGN PATENT DOCUMENTS

| | | |
|---|---|---|
| KR | 101386294 B1 | 4/2014 |
| WO | 2014105160 A1 | 7/2014 |
| WO | 2015094261 A1 | 6/2015 |
| WO | 2016003833 A1 | 1/2016 |
| WO | 2016018502 A1 | 2/2016 |
| WO | WO2018136801 A1 | 7/2018 |
| WO | WO2018136804 A1 | 7/2018 |
| WO | WO2018136811 A1 | 7/2018 |

OTHER PUBLICATIONS

"International Search Report" and "Written Opinion of the International Searching Authority," Patent Cooperation Treaty Application No. PCT/US2018/014530, dated Apr. 23, 2018, 7 pages.

"International Search Report" and "Written Opinion of the International Searching Authority," Patent Cooperation Treaty Application No. PCT/US2018/014551, dated Apr. 24, 2018, 8 pages.

Petition to Insitute Derivation Proceeding Pursuant to 35 USC 135; Case No. DER2019-00009, U.S. Patent and Trademark Office Patent Trial and Appeal Board; Jul. 26, 2019, 272 pages. (2 PDFs).

SCAMP Working Paper L29/11, "A Woods Hole Proposal Using Striping," Dec. 2011, 14 pages.

O'Hara, Michael James, "Shovel-ready Private Information Retrieval," Dec. 2015, 4 pages.

Carr, Benjamin et al., "Proposed Laughing Owl," NSA Technical Report, Jan. 5, 2016, 18 pages.

Williams, Ellison Anne et al., "Wideskies: Scalable Private Information Retrieval," 14 pages.

Carr, Benjamin et al., "A Private Stream Search Technique," NSA Technical Report, Dec. 1, 2015, 18 pages.

Drucker et al., "Paillier-encrypted databases with fast aggregated queries," 2017 14th IEEE Annual Consumer Communications & Networking Conference (CCNC), Jan. 8-11, 2017, pp. 848-853.

Tu et al.,, "Processing Analytical Queries over Encrypted Data," Proceedings of the VLDB Endowment, vol. 6, Issue No. 5, Mar. 13, 2013. pp. 289-300.

Boneh et al., "Private Database Queries Using Somewhat Homomorphic Encryption", Cryptology ePrint Archive: Report 2013/422, Standford University [online], Jun. 27, 2013, [retrieved on Dec. 9, 2019], 22 pages.

Chen et al., "Efficient Multi-Key Homomorphic Encryption with Packed Ciphertexts with Application to Oblivious Neural Network Inference", CCS'19 Proceedings of the 2019 ACM SIGSAC Conference on Computer and Communications Security, May 19, 2019. pp. 395-412.

Armknecht et al., "A Guide to Fully Homomorphic Encryption" IACR Cryptology ePrint Archive: Report 2015/1192 [online], Dec. 14, 2015, 35 pages.

Bayar et al., "A Deep Learning Approach to Universal Image Manipulation Detection Using a New Convolutional Layer", IH&MMSec 2016, Jun. 20-22, 2016. pp. 5-10.

Juvekar et al. "Gazelle: A Low Latency Framework for Secure Neural Network Inference", 27th USENIX Security Symposium, Aug. 15-17, 2018. pp. 1650-1668.

Bösch et al., " SOFIR: Securely Outsourced Forensic Recognition," 2014 IEEE International Conference on Acoustic, Speech and Signal Processing (ICASSP), IEEE 978-1-4799-2893-4/14, 2014, pp. 2713-2717.

Waziri et al., "Big Data Analytics and Data Security in the Cloud via Fullly Homomorphic Encryption," World Academy of Science, Engineering and Technology International Journal of Computer, Electrical, Automation, Control and Information Engineering, vol. 9, No. 3, 2015, pp. 744-753.

Bajpai et al., "A Fully Homomorphic Encryption Implementation on Cloud Computing," International Journal of Information & Computation Technology, ISSN 0974-2239 vol. 4, No. 8, 2014, pp. 811-816.

Viejo et al., "Asymmetric homomorphisms for secure aggregation in heterogeneous scenarios," Information Fusion 13, Elsevier B.V., Mar. 21, 2011, pp. 285-295.

Patil et al, "Big Data Privacy Using Fully Homomorphic Non-Deterministic Encryption," IEEE 7th International Advance Computing Conference, Jan. 5-7, 2017, 15 pages.

* cited by examiner

SYSTEMS AND METHODS FOR EFFICIENT FIXED-BASE MULTI-PRECISION EXPONENTIATION

CROSS REFERENCE TO RELATED APPLICATIONS

This application claims the benefit and priority of U.S. Provisional Application Ser. No. 62/448,916, filed on Jan. 20, 2017; U.S. Provisional Application Ser. No. 62/448,883, filed on Jan. 20, 2017; U.S. Provisional Application 62/448,885, filed on Jan. 20, 2017; and U.S. Provisional Application Ser. No. 62/462,818, filed on Feb. 23, 2017, all of which are hereby incorporated by reference herein, including all references and appendices, for all purposes.

FIELD OF INVENTION

The present disclosure is directed to the technical field of systems that utilize computational algorithms as applied to encryption methods, and specifically homomorphic encryption as disclosed in the related applications above, and computing systems. More particularly, the present disclosure related to the technical field of multi-precision arithmetic algorithms.

SUMMARY

According to some embodiments, the present disclosure is directed to a method comprising: applying a multi-precision exponentiation algorithm to a base number, the multi-precision exponentiation algorithm comprising a pre-generated lookup table used to perform calculations on the base number, the pre-generated lookup table comprising pre-calculated exponentiated values of the base number. This method includes returning one or more calculated values for the base number, as well.

According to some embodiments, the present disclosure is directed to a system comprising: a processor; and a memory for storing executable instructions, the processing executing the instructions to: apply a multi-precision exponentiation algorithm to a large base number, the multi-precision exponentiation algorithm comprises a pre-generated lookup table used to perform calculations on the base number, the pre-generated lookup table comprising pre-calculated exponentiated values of the base number; and return a calculated value for the base number.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Generally speaking, the present disclosure includes systems and methods that provide efficient fixed-base multi-precision exponentiation calculations in order to perform compute operations on numbers that are larger than 64 bits. These processes are generally referred to as multi-precision processing.

For context, many computational algorithms, especially encryption algorithms such as Paillier, RSA, or ElGamal, involve performing arithmetic operations on very large numbers. These numbers commonly require several thousand bits to represent on a computer. Modern general-purpose computer hardware can only perform arithmetic operations directly on numbers that can be represented in 32 bits (called single precision numbers) or 64 bits (called double precision). To perform operations on larger numbers, special-purpose algorithms known as multi-precision arithmetic (also known as arbitrary-precision arithmetic) algorithms must be used.

The systems and methods disclosed herein implement algorithms for efficient multi-precision exponentiation in cases where the same base value is raised to many different exponents. The systems and methods perform a pre-computation step that generates a lookup table containing at least one base value which is raised to many different exponents. In some embodiments, many lookup tables is pre-generated and stored for later use.

Then, each of the desired exponentiations is performed by multiplying together different elements of the lookup table, which reduces the amount of computation required for each exponent. If there are enough exponents to compute, the time saved in computing each exponent provides benefits that outweigh lookup table construction time. Thus, these systems and methods improve the performance of the underlying computing system by allowing for faster and more efficient multi-precision computation. Moreover, these methods disclosed herein enable a computing system to perform compute operations that are impossible for computing devices enabled for performing computing operations on numbers having 32 or 64 bits. These computing systems that are only configured to perform single and double precision computations can benefit by being able to perform arbitrary-precision/multi-precision computations using methods disclosed herein. In sum, the problem being solved by these systems and methods is a computer-centric or technological problem and the solutions disclosed herein improve the performance of the computer.

Figure 3:
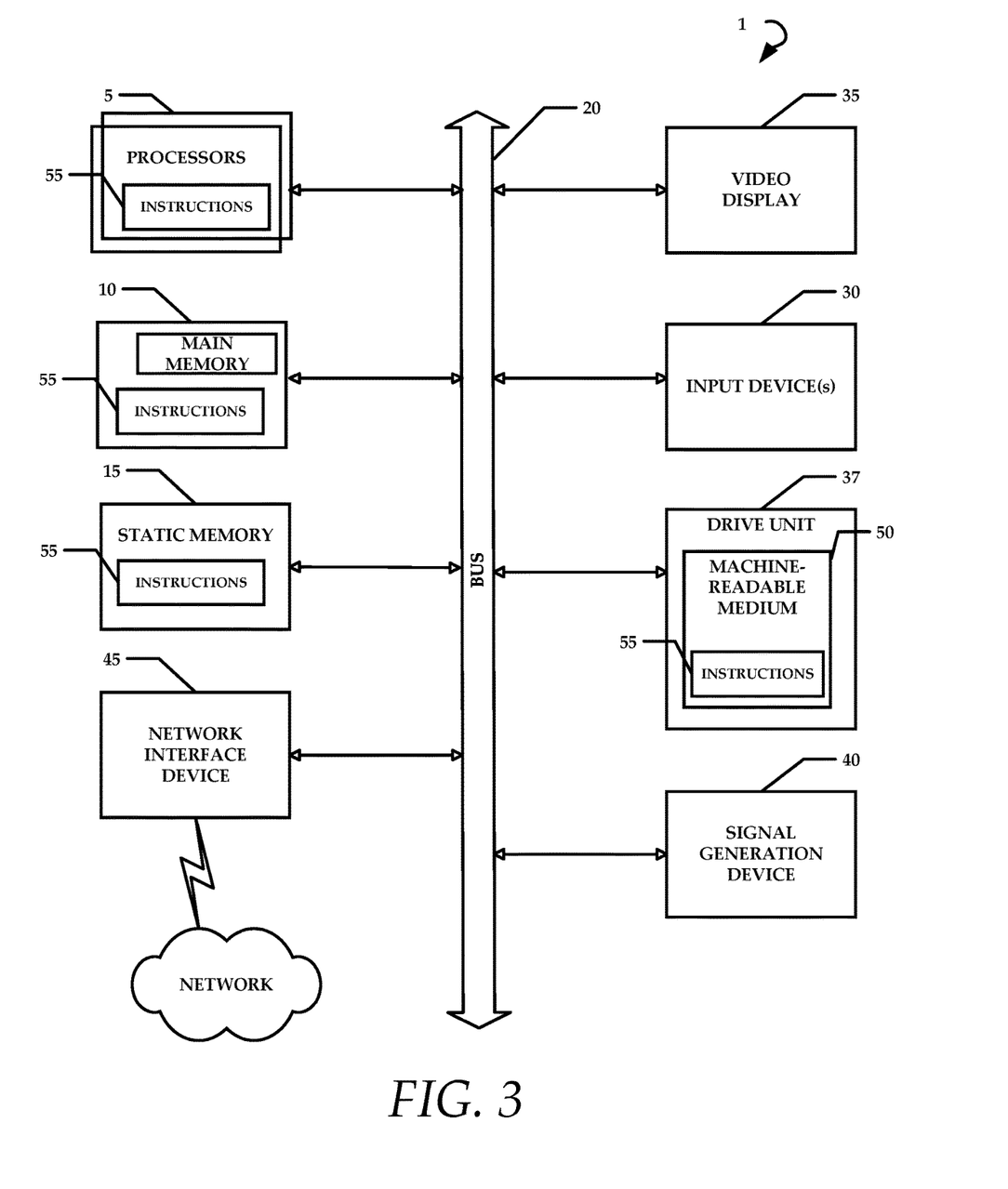
FIG. 3 illustrates an exemplary computing system that may be used to implement embodiments according to the present technology.

The following method is performed using a specifically configured computing system. For example, the computer system of FIG. 3 is specifically configured to perform the methods (e.g., multi-precision exponentiation algorithms) described herein.

A specifically configured computer system of the present disclosure is configured to exponentiate a large number. For example, the system exponentiates a base number B which is a large number requiring at least 128 bits to be represented on a system. The base number B is exponentiated with a set of exponential value numbers $E=\{E_1, E_2, \ldots, E_n\}$. These exponent values are of any size. The following algorithm efficiently computes the exponential values of B across E:

$$V=\{V_1, V_2, \ldots, V_n\} \text{ where } V_i=B^{E_i} \text{ for all } i.$$

In other words, the system will utilize the equation above, taking a desired base number B and a set of n desired exponents E, and efficiently computes B raised to each of the exponents.

A lookup table for the base number B is created by the system using the following process. In some embodiments, the system is configured to perform a computation where $E_{max}$ is a largest value exponent in the desired set of exponents E. Also, Y is a number of bits required to represent the largest value exponent $E_{max}$. The system applies an exponent size parameter d, where 0<d≤Y be (larger values of d require more memory but leads to larger computational speedups, as described below).

Also, R=[Y/d] is a number of d-bit "windows" required to represent any value in the desired set of exponents E. The system also applies a number of possible values in a d-bit window, represented as $C=2^d$.

Using the construct above, the system will generate a lookup table T, with R rows and C columns. The following descriptions will referrer to an element in row i and column j of T as $T_{i,j}$, where 0≤i<R and 0≤j<C.

The system begins by setting the variable $T_{i,0}=1$ for all i. Then, the system sets the variable $T_{0,1}=B$. The system will then compute a remainder of row 0 as follows: for each i∈{2k+1|0<k and 2k+1<C} the system will first determine if i>1. If this is true the system will calculate $T_{0,i}=T_{0,1}\times T_{0,i-1}$. Next, for each j∈{2i, 4i, . . . , ki|ki<C} the system will calculate $T_{0,j}=T^2_{0,j/2}$. Stated otherwise, the system takes each odd index less than C, computes a value at that index by multiplying $T_{0,1}$ with the value at the previous index (which is equivalent to adding 1 to the exponent at the previous index), and then continually doubles the index and squares the value at that index (which is equivalent to doubling the exponent) until the system determines that an end of the row 0 has been reached. In this way, the system will compute an appropriate exponentiated or raised value for each index in row 0.

Next, the system will compute subsequent rows one at a time as follows: For each r∈{1, 2, . . . , R−1}, the system sets $T_{r,1}=T^2_{r-1,C/2}$. The system then repeats the process above using $T_{r,1}$ in place of $T_{0,1}$ to compute remaining values for the row.

The result of this process is that row r of the lookup table will contain $\{B^{2rd\times 1}, B^{2rd\times 2}, \ldots, B^{2rd\times(2d-1)}\}$. In other words, the r-th row will contain all possible values for the r-th d-bit "window" of an exponent.

The system now computes V as follows. For each i∈{1, . . . n}, the system obtains a binary representation of $E_i$ and segments this binary representation into R blocks of d bits each (if there are fewer than R×d bits in the exponent, the system will append 0's in high-order positions until there are R×d bits). The system will set $E_i^r$ as the r-th such block. Then, the system computes $$V_i = \prod_{r=0}^{R-1} T_{r,E_i^r}.$$

This step requires at most R multi-precision multiplication operations to compute each exponent.

In encryption algorithms, multi-precision exponentiation is usually applied relative to some modulus M. For example a user is interested in computing the following data: V={$B^{E_1}$ mod M, $B^{E_2}$ mod M, . . . }. In this case, the system applies Montgomery multiplication, which is a method for speeding up successive modular multiplication operations over multi-precision numbers. The system converts B into Montgomery form prior to initiating the process described above. The system replaces the multi-precision multiplication operations described above with Montgomery multiplication operations, and convert the final responses in V out of Montgomery form prior to returning the answer. To be sure, other algorithmic and methodological solutions for computing over large numbers that utilize the present disclosure are contemplated and thus the present disclosure is not limited to the examples provided herein.

Given some base B and exponents E, the system determines whether the multi-precision exponentiation algorithm will be faster than performing the exponentiation directly on each exponent (i.e., with no lookup table). The system also determines what value of d is optimal by estimating a number of multi-precision operations (such as multiplication) that will be required with d={0, 1, 2, . . . $d_{max}$}, where d=0 corresponds to no lookup table and $d_{max}$ is the value of the exponent size parameter based upon memory limitations. The number of values in the lookup table, not counting the 1's in the first column, will be equal to R×(2d−1). Therefore, some embodiments impose a limit upon d so that the lookup table does not grow too large and run the program out of memory (e.g., the available memory for a multi-precision exponentiation algorithm application is exhausted). This exhaustion of memory includes memory dedicated for the multi-precision exponentiation algorithm application or available free memory of a computing device that is executing the multi-precision exponentiation algorithm application.

When considering the multi-precision multiplications involved with each value of d, the system segments d values into two categories: squarings (i.e., multiplication of a number with itself) and non-squarings (i.e., multiplication of two different numbers). It will be understood that in practice, a multi-precision squaring operation is significantly faster than a non-squaring operation.

In some embodiments, W is an index of a highest bit set in E (i.e., W=|log $E_{max}$|). With d=0, a number of multi-precision squarings required for each exponent is equal to W, and the number of non-squarings averages $$\frac{\log E}{2}.$$

With d>0, computing lookup table requires $$\frac{W2^{d-1}}{d}$$

squarings and $$\frac{W(2^{d-1}-1)}{d}$$

non-squarings as a one-time cost, and then an average of $$\frac{W(2^{d-1}-1)}{d2^{d-1}}$$

non-squarings to compute each exponent.

Given n, W, and $d_{max}$, the system takes the optimal value of d to be the value that minimizes a total time given by these estimates. The system utilizes this value to determine how large a lookup table would be. The system skips generating a lookup table and calculate exponentiations directly when d=0 (e.g., is optimal).

In this manner, efficient computation of multi-precision exponentiation, in cases where the same base must be raised to many different exponents, may be completed using the foregoing methods and systems.

Figure 1:
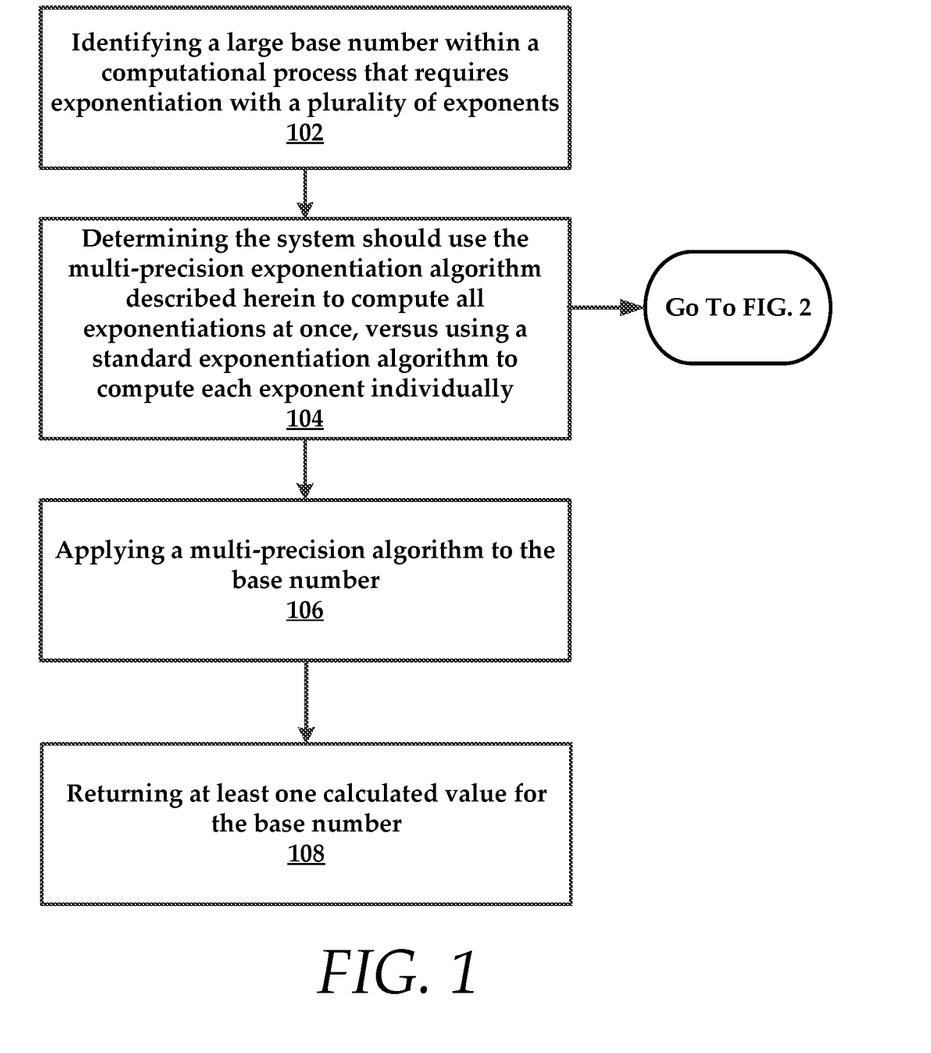
FIG. 1 is a flowchart of an example method for utilizing a multi-precision exponentiation algorithm to perform exponentiation of a large base number (e.g., above 64 bits).

FIG. 1 is a method of the present disclosure for utilizing a multi-precision exponentiation algorithm to perform exponentiation of a large base number (e.g., above 64 bits) across a plurality of exponents.

In some embodiments, the method includes a step 102 of identifying a large base number within a computational process that requires exponentiation with a plurality of exponents. For example, a large base number is identified during the calculation of an analytic or generating a response to a query or a mathematical problem.

In some embodiments, this step includes determining that a base number has a size that exceeds a size threshold. For example, the size threshold is any number greater than 64 bits.

Once a large base number has been identified, the method includes an optional step of determining if a time required for using the multi-precision exponentiation algorithm to exponentiate the base number is less than a time required to perform exponentiation of the base number directly using exponents. In some embodiments, the multi-precision exponentiation algorithm is used only when the time required for using the multi-precision exponentiation algorithm to exponentiate the base number is less than the time required to perform exponentiation of the base number directly using exponents.

In sum, step 104 includes determining the system should use the multi-precision exponentiation algorithm described herein to compute all exponentiations at once, versus using a standard exponentiation algorithm to compute each exponent individually.

Stated otherwise, this step determines if the use of a lookup table is preferred over calculating exponential values on the fly (e.g., at computational runtime). This includes determining a time to generate the lookup table versus calculating exponential values on the fly.

If the use of the lookup table is preferred, the method includes a step 106 of applying a multi-precision exponentiation algorithm to a base number. Again, the multi-precision exponentiation algorithm comprises the use of a pre-generated lookup table used to perform calculations on the base number. A specified above, the lookup table comprises pre-calculated exponentiated values of the base number. For example, the base number is raised exponentially using a range of exponent values of the specified exponents. These resultant values are stored in the lookup table. These values are obtained when performing a desired calculation on the base number. Rather than having to exponentiate the base number a plurality of times during performance of the calculation, the system obtains pre-exponentiated values from the lookup table as needed. For example, assume the desired exponent is the binary number 10101010, the maximum exponent size $E_{max}$ is 8, and the window side d is 4, for an arbitrary base number B. This means that the lookup table will contain both $B^{10100000}$ and $B^{1010}$, so the desired result $B^{10101010}$ is obtained in one multiplication operation. Without using the lookup table, seven squaring operations are necessary to obtain $B^{10000000}$, plus three multiplication operations (with $B^{100000}$, $B^{1000}$, and $B^{10}$) to obtain the same result.

In some embodiments, the method includes a step 108 of returning at least one calculated value for the base number.

In one or more embodiments, the method includes optional steps such as converting the base number into a form suitable for use in an encryption algorithm.

Figure 2:
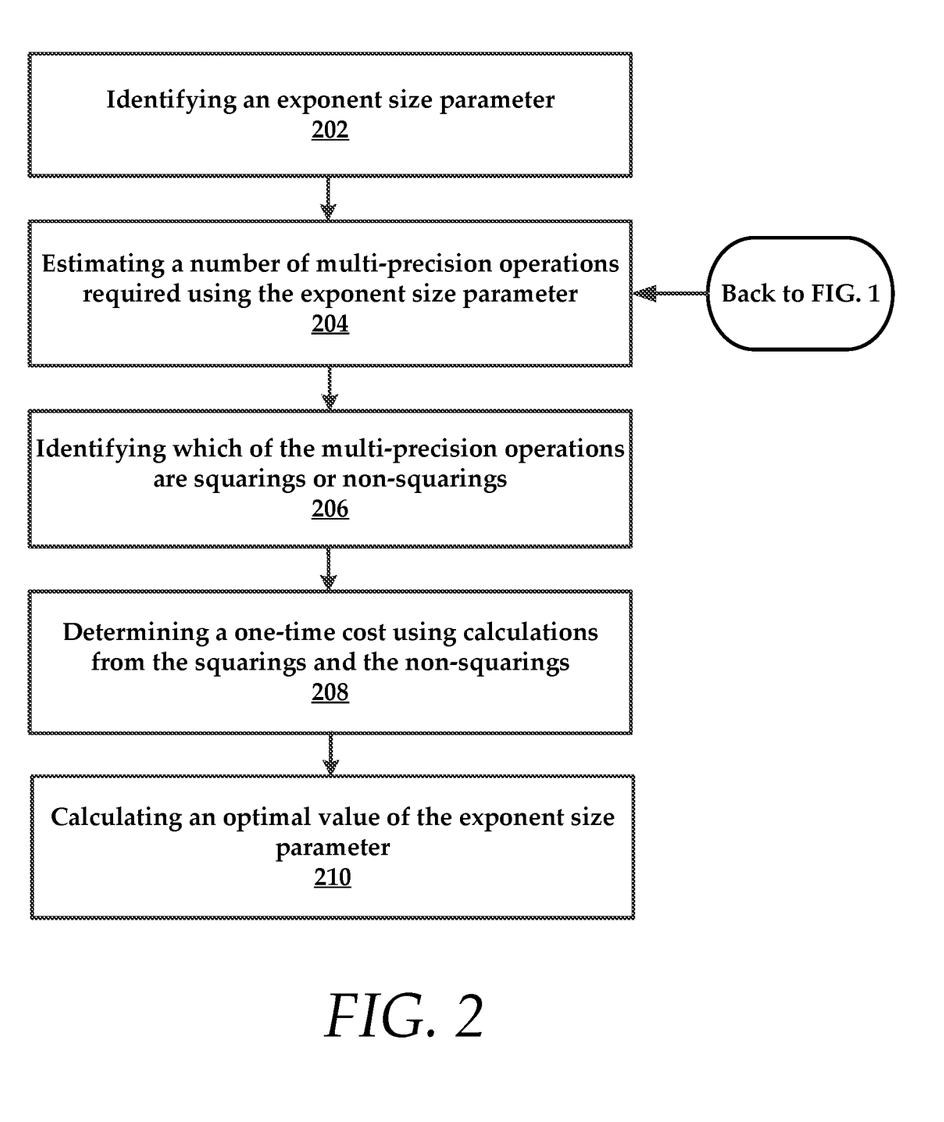
FIG. 2 is a flowchart of an example method for determining if a time required for using the multi-precision exponentiation algorithm is less than a time required to perform the calculations of the base number directly using exponents.

FIG. 2 is a flowchart of an example sub-method for determining if a time required for using the multi-precision exponentiation algorithm is less than a time required to perform the calculations of the base number directly using exponents (as noted in step 104 of FIG. 1).

In various embodiments, the method of FIG. 2 includes a step 202 of identifying an exponent size parameter. As mentioned above, the exponent size parameter is greater than zero and is equal to or less than the largest exponent value in the set of exponents. In some instances, the exponent size parameter is selected to prevent the lookup table from growing to a point where memory of a multi-precision exponentiation algorithm application is exhausted.

Next, the method includes a step 204 of estimating a number of multi-precision operations required using the exponent size parameter. In some instances, the method includes a step 206 of identifying which of the multi-precision operations are squarings or non-squarings, as well as a step 208 of determining a one-time cost using calculation from the squarings and the non-squarings.

In some embodiments, the method includes optional steps of identifying an index of a highest bit set in the exponents.

In one or more embodiments, the method includes a step 210 of calculating an optimal value of the window size parameter. This calculation is a function of the one-time cost, the index of a highest bit set, and a highest possible value for the exponent size parameter.

FIG. 3 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
   determining, via a processor, that a base number has a size that exceeds a size threshold, wherein the size threshold is greater than 64 bits; and
   applying, via the processor, a multi-precision exponentiation algorithm to the base number, the multi-precision exponentiation algorithm comprising a pre-generated lookup table used to perform calculations on the base number, the pre-generated lookup table comprising pre-calculated exponentiated values of the base number, wherein the pre-generated lookup table is stored in a memory, the memory being coupled to the processor;
   wherein an exponent size parameter of each of the pre-calculated exponentiated values in the pre-generated lookup table is selected by the processor based on a size limitation of a memory portion dedicated in the memory to the multi-precision exponentiation algorithm to prevent the pre-generated lookup table from growing to a size at which the memory portion dedicated in the memory to the multi-precision exponentiation algorithm is exhausted.

2. The method according to claim 1, further comprising:
   identifying the base number as having a size that is more than 64 bits; and
   determining if a time required for using the multi-precision exponentiation algorithm is less than a time required to perform the calculations of the base number directly using exponents,
   wherein the multi-precision exponentiation algorithm is used only when the time required for using the multi-precision exponentiation algorithm is less than the time required to perform the calculations of the base number directly using exponents.

3. The method according to claim 2, wherein determining if a time required for using the multi-precision exponentiation algorithm is less than a time required to perform the calculations of the base number directly using exponents further comprises:
   identifying the exponent size parameter;
   estimating a number of multi-precision operations required using the exponent size parameter;
   identifying which of the number of multi-precision operations are squarings or non-squarings; and
   determining a one-time cost using calculations from the squarings and the non-squarings.

4. The method according to claim 1, further comprising selecting exponents that will be used to exponentiate the base number.

5. The method according to claim 4, further comprising identifying an index of a highest bit set in the exponents.

6. The method according to claim 1, further comprising converting the base number into a form suitable for use in an encryption algorithm.

7. The method according to claim 5, wherein an optimal value of the exponent size parameter is a function of a number of the exponents, the index of the highest bit set, and a highest possible value for the exponent size parameter.

8. A system, comprising:
a processor; and
a memory for storing executable instructions, the memory being coupled to the processor, the processor executing the instructions to:
determine if a time required for using a multi-precision exponentiation algorithm to exponentiate a base number is less than a time required to perform exponentiation of the base number directly using exponents;
apply a multi-precision exponentiation algorithm to the base number, wherein the multi-precision exponentiation algorithm comprises a pre-generated lookup table used to perform calculations on the base number, the pre-generated lookup table comprising pre-calculated exponentiated values of the base number, wherein the pre-generated lookup table is stored in the memory;
wherein an exponent size parameter of each of the pre-calculated exponentiated values in the pre-generated lookup table is selected by the processor based on a size limitation of a memory portion dedicated in the memory to the multi-precision exponentiation algorithm to prevent the pre-generated lookup table from growing to a size at which the memory portion dedicated in the memory to the multi-precision exponentiation algorithm is exhausted; and
return a calculated value for the base number.

9. The system according to claim 8, wherein the processor is further configured to identify a base number with a size that is more than 64 bits.

10. The system according to claim 9, wherein the pre-generated lookup table comprises raised values corresponding to exponentiation of the base number with the exponents.

11. The system according to claim 10, wherein the processor is further configured to select the exponents that will be used to exponentiate the base number when generating the pre-generated lookup table.

12. The system according to claim 8, wherein the processor is further configured to convert the base number into a form suitable for use in an encryption algorithm.

* * * * *